May 4, 1965  T. E. NOAKES  3,182,149
PRESSURE-OPERATED CONTROL HAVING MEANS FOR ADJUSTING THE
ACTUATING PRESSURES OF A PLURALITY OF CONTROL SWITCHES
Filed Oct. 25, 1961
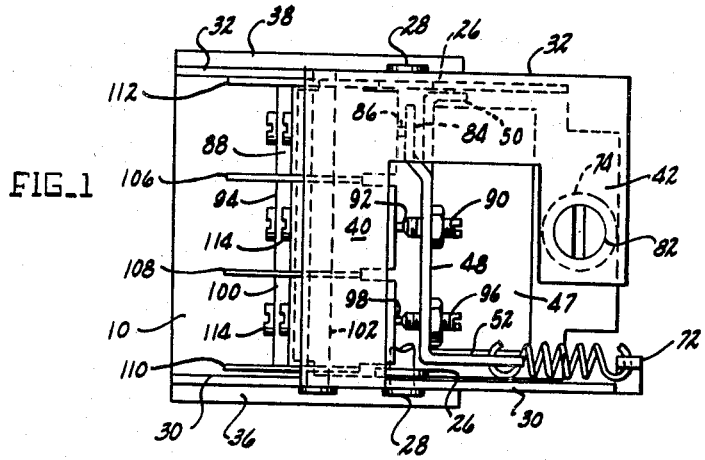
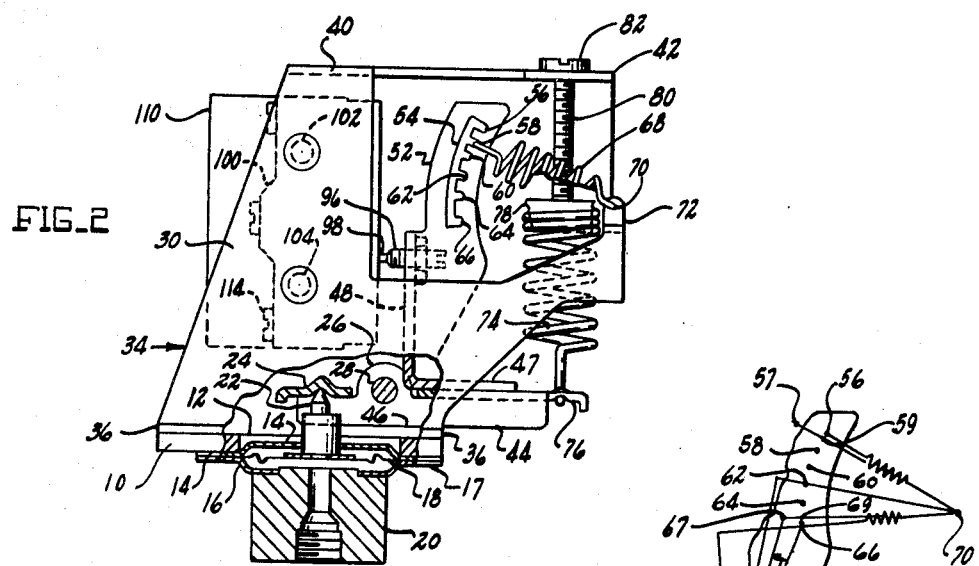
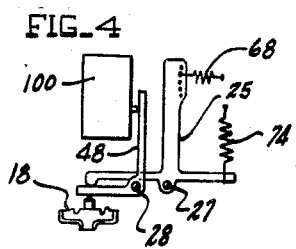
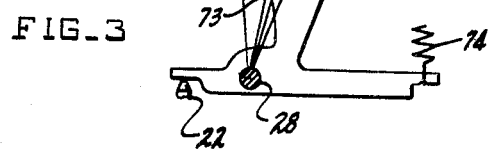
INVENTOR.
THOMAS E. NOAKES
BY
Andrew K. Douglas
his ATTORNEY

United States Patent Office 3,182,149
Patented May 4, 1965

3,182,149
PRESSURE-OPERATED CONTROL HAVING MEANS FOR ADJUSTING THE ACTUATING PRESSURES OF A PLURALITY OF CONTROL SWITCHES
Thomas E. Noakes, Detroit, Mich., assignor to American Radiator & Standard Sanitary Corporation, New York, N.Y., a corporation of Delaware
Filed Oct. 25, 1961, Ser. No. 147,557
10 Claims. (Cl. 200—81.5)

This invention relates to pressure-operated controls such as electric switches. One application of the invention is in the field of fluid pressure-operated switches where it is desired to actuate various switches in predetermined order at preselected fluid pressures, as for example actuation of one switch at 40 p.s.i., actuation of a second switch at 45 p.s.i., and actuation of a third switch at 50 p.s.i.

One object of the present invention is to provide a pressure-operated control wherein a plurality of control devices such as electric switches are adapted to be actuated at precise preselected pressures irrespective of variations in manufacture of each control device or the pressure device with which it is associated.

In one application of the invention, a particular object is to provide a fluid pressure-operated electric switch arrangement having a plurality of electric switches such that variations in switch manufacture and fluid pressure responsive mechanism are balanced out by the provision of an adjustable spring means.

In a still more particularized statement, one object of the invention is to provide in a pressure-operated switch arrangement a spring mechanism which can be adjusted so that its spring rate is varied without varying its initial load force on the mechanism, the arrangement being such that the spring rate of the system can be changed to compensate for changes in spring rate caused by variations in manufacture of the electric switches and pressure mechanism.

A general object of the invention is to provide a pressure-operated control having an improved calibration mechanism.

Other objects of this invention will appear from the following description and appended claims, reference being had to the accompanying drawings forming a part of this specification wherein like reference characters designate corresponding parts in the several views.

In the drawings:

FIGURE 1 is a top plan view of a structure incorporating features of the invention;

FIG. 2 is an elevational view of the FIG. 1 structure, with portions broken away to illustrate interior details;

FIG. 3 is a diagram illustrating forces developed during operation of the FIG. 1 structure; and FIG. 4 is a schematic showing of a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The device shown in the drawings comprises a pressure-responsive diaphragm 18 which acts to move lever 24 around the fulcrum shaft 28 against the action of tension spring 74 so that the upstanding portion 48 of the lever sequentially moves the plungers 90, 92 and 86 of the three snap switches 100, 94 and 88. An adjustable spring 68 is provided to calibrate the device so that the various switches are actuated at the precise desired pressure values irrespective of manufacturing variations in switch construction or diaphragm construction.

Referring more particularly to the drawing, there is shown in FIG. 2 a fluid pressure-operated switch assembly comprising a rectangular base plate 10 having a circular opening 12 for accommodating the upwardly bulged portion of an annular wall 14. A second annular wall 16 has its peripheral flange portion 17 mating with the peripheral flange portion of wall 14, and a thin stainless steel corrugated diaphragm 18 has its peripheral edge welded therebetween. Housing wall 16 is carried on a hollow block 20 so that when the block is connected to a source of fluid pressure the fluid pressure force is applied to the underside of diaphragm 18. The diaphragm carries an upstanding pin 22 which engages a lever 24, said lever being preferably formed as a rather heavy stamping having two spaced ears 26 arranged to encircle a headed shaft 28, said shaft extending through the upstanding walls 30 and 32 of a frame structure designated generally by numeral 34.

The detailed construction of frame structure 34 may be varied considerably, but as shown in the drawings said frame structure may include two laterally extending flanges 36 and 38 extending laterally from the lower edges of walls 30 and 32, and suitably secured to the upper face of base 10. The frame structure may be completed by a top wall 40 which spans the space between upstanding walls 30 and 32, and which includes a horizontally extending roof-life extension 42.

From the description thus far, it will be seen that frame structure 34 serves to support headed shaft 28, said shaft in turn serving as a fulcrum for the lever 24. As shown in FIG. 2, lever 24 may be provided with downwardly extending side flanges 44 and 46 for reinforcement purposes. The portion of lever 24 located to the right of shaft 28 may have suitably affixed thereto a wall member 47, shown in FIG. 2 as of generally L-shaped configuration in elevation. The upstanding portion 48 of member 47 may be equipped with side flanges 50 and 52, and one or both of these flanges may be provided with a slot 54 configured to define notch-like seating surfaces 56 through 66 for selective anchoring cooperation with the left end of a coil-type tension spring 68. The right end of spring 68 may be anchored in an opening 70 formed in the offset extension 72 of frame wall 30. Spring 68 tends to move lever 24 in a clockwise direction about pivot shaft 28 for a purpose to be described hereinafter.

In order to provide the major loading force opposing the fluid pressure on diaphragm 18 there is utilized a relatively heavy tension spring 74 having its lower end anchored on portion 76 of lever 24 and having its upper end engaged with a plug 78. Plug 78 is provided with a threaded bore for reception of the threaded shank portion 80 of the range adjustment screw 82. The external side surface of plug 78 may be configured to define a spiral groove for engaging the closed coil convolutions on the upper end of spring 74, the arrangement being such that plug 78 is securely affixed to the uppermost coil convolutions without relative movement therebetween. Thus, manual rotative adjustment of screw 82 causes plug 78 to travel vertically on shank 80 so as to change the effective length of tension spring 74. This varies the resistance load on lever 24 and determines the fluid pressure which must be applied to move the lever through a predetermined incremental distance.

As shown particularly in FIG. 1, the upstanding portion 48 of lever member 47 is provided with a wall section 84 which registers with the plunger 86 of a conventional snap switch 88. Wall portion 48 is also provided with an adjustable set screw 90 which registers with the plunger 92 of a conventional snap switch 94, and an adjustable set screw 96 which registers with the plunger 98 of a conventional snap switch 100. Each of the snap switches may be of the conventional type having a snapable spring blade (not shown) which is progressively loaded by an inward plunger movement to a point where it snaps to change the direction of current flow across the switch terminals 114. In this type switch outward movement of the plunger is accompanied by a snap back of the switch blade to its starting position.

The switches may be fixedly mounted within frame 34 by any suitable means, but as shown in the drawing the mounting means may comprise two elongated pins 102 and 104 extending through openings formed in the various switches and frame walls 30 and 32. If desired the switches may be spaced from one another by the partition-forming plates 106, 108, 110 and 112, preferably formed of dielectric material.

In one application of the invention the various set screws are suitably adjusted so that when the fluid pressure on the underside of diaphragm 18 reaches a particular value, as for example 40 p.s.i., the plunger 86 will be moved sufficiently to actuate switch 88; and when the fluid pressure reaches a higher value, such as 45 p.s.i., plunger 92 will be sufficiently moved to actuate switch 94; and when the fluid pressure reaches a still higher value, such as 50 p.s.i., plunger 98 will be sufficiently moved to actuate switch 100.

As before noted, each of the snap switches has incorporated therein a snap action switch blade (not shown). The snap action switch blade becomes progressively loaded by depression of the switch plunger, until at a particular loading the switch blade snaps overcenter to actuate the switch from one position to the other. This type switch requires that a particular actuating force be developed on its plunger before the switch blade undergoes its snapping movement in one direction; also the force on the plunger must be reduced to a particular release value before the blade snaps back to its starting position.

Variations in manufacture of the switch blades and switch components are such that the blade-actuating forces and blade release forces are not precisely uniform from one switch to another. For example, one switch having a nominal actuating force of sixteen ounces and a nominal release force of twelve ounces may in fact have an actuating force of fifteen ounces and a release force of eleven ounces. Another similarly rated switch may have an actuating force of seventeen ounces and a release force of twelve ounces.

These variations tend to undesirably vary the rate at which the spring resistance to fluid pressure changes so that the switches may not in all cases be actuated at the expected lever 24 positions. A further factor tending to unpredictably vary the resistance to fluid pressure change is variation in the resistance to fluid pressure offered by metal diaphragm 18. The diaphragm has spring characteristics which are effected by such factors as sheet thickness, corrugation character, heat treatment, and the manner of welding to the housing.

As a result of these factors the rate at which the spring load on lever 24 changes with lever movement may not be the same from one assembly to the next. Because of this factor unless precautions are taken the adjustment of screws 90 and 96 to insure correct actuation of the various switches must be on a time-consuming trial and error basis. Under the present invention spring 68 is utilized as a spring rate-changing device to eliminate much of the trial and error work involved in calibration of the assembly.

Assuming for the moment that spring 68 is not present, calibration of the assembly would be accomplished by adjusting screws 90 and 96 so that the leading ends of the three plunger-contacting surfaces are arranged in planes spaced predetermined distances from one another. In a particular illustration the operating plane of wall section 84 might be spaced about .008 inch from the operating plane of screw 96, with the operating plane of screw 90 located in an intermediate position about .004 inch from each of these operating planes. Block 20 would be connected to a source of fluid pressure having a pressure indicator thereon. The pressure would then be set at a particular value, as for example 40 p.s.i., after which screw 82 would be turned to vary the force of spring 74. The force of spring 74 on lever 24 would thereby change until the lever had sufficiently altered its position to actuate switch 88.

After adjustment of screw 90 the fluid pressure would be set at a different value, as for example 50 p.s.i., and screw 96 would be adjusted until switch 100 was actuated. This would alter the loading on the blade in switch 94, with consequent change in the total load resistance to fluid pressure. Thus, the actuation pressures for switches 88 and 94 are undesirably affected.

It is of course possible for the operator, by repeated adjustments of screws 90, 96 and 82, to ultimately make the switches actuate at their desired fluid pressure values. However the calibrating operation is time-consuming and requires a certain degree of skill on the part of the operator.

In the present invention the calibrating operation is performed by using a spring 68 to change the rate at which the spring system resistance changes in opposition to fluid pressure change. By thus changing the spring rate there is no necessity for making drastic changes in the position of screws 90 and 96.

Referring to FIG. 3, lever 24 and the associated elements are schematically shown, with the spring 68 being shown in two alternative positions, one position stretched between anchoring point 70 and anchoring point 56, and a second position stretched between anchoring point 70 and anchoring point 66. Assuming that spring 66 is trained between points 70 and 66, then it will be seen that incremental movement of lever 24 through an arc 114 causes anchoring point 66 to move to a new point 67. Spring 68 will thereby increase in length by the distance between points 69 and 67.

Assuming for the moment that we had connected spring 68 between points 56 and 70, it can be shown that when lever 24 moves through an arc 114 the point 56 will move to location 57. The spring 68 will thus be lengthened by the distance between points 59 and 57. This distance is greater than the aforementioned distance between points 67 and 69, and it can therefore be seen that the rate of the system is greater when spring 68 is trained between points 56 and 70 than when said spring is trained between points 66 and 70. This variation in spring rate (by adjustment of spring 68 to various ones of its anchoring seats 56 through 66) can be used to accurately calibrate the assembly.

In order that spring 68 may be effectively utilized for calibrating purposes, it is necessary that when the spring is adjusted from one anchoring point on lever 24 to another anchoring point, the effective spring load be unaffected. Thus, if the load were to change when we switched from point 56 to point 66 there would be an undesired variation in the actuation fluid pressure for switch 88, with deleterious effect on the actuation pressure of the other switches also.

The spring load may be affected by the fact that the various anchoring points 56 through 66 are spaced different lever arm distances from fulcrum shaft 28, and by the fact that spring 68 does not act in the same manner in each of its adjusted positions. In order that spring 68 will always have the same initial effective load on lever 24, the various anchoring points 56, 58, 60, 62, 64 and 66 are spaced slightly different distances from anchoring point 70. In general, point 56 is closest to point 70, and point 66 is furthest away from point 70.

When spring 68 is trained between points 66 and 70 its moment arm about shaft 28 may be represented by an imaginary line 71. When spring 68 is trained between points 62 and 70 its moment arm about shaft 28 may be represented by imaginary line 73. The product of the moment arm and the spring force should be the same for each adjusted position of spring 68. Since moment arm 73 is greater than moment arm 71, spring 68 must in its initial position be stretched further when trained between points 66 and 70 than when trained between points 62 and 70. Similar theory applies with respect to anchorage points 64, 60, 58 and 56.

From the above discussion it will be realized that the depths of the various notches 56, 58, 60, 62, 64 and 66 will be varied slightly, with notch 56 being the deepest, and with notch 66 being the shallowest, the general arrangement being such that in all initial positions of spring 68 the product of the moment arm and spring force is the same.

When calibrating the instrument through the use of spring 68, the procedure involves initially adjusting set screws 90 and 96 to spaced positions as previously noted. Also, spring 68 is disposed with its left end in any one of the notches 56 through 66, and the block 20 is connected to a suitable source of pressure. The fluid pressure is then set at a suitable value, as for example 40 p.s.i., and screw 82 is adjusted until the switch 88 is actuated. The fluid pressure is then increased successively to suitable values such as 45 and 50 p.s.i., and the operator mentally notes whether switches 94 and 100 are actuated at the desired pressure values. Switch actuation at other than the correct pressure values is an indication that the spring system is changing its fluid pressure resistive force at an undesired rate. By changing the position of spring 68 so that it is anchored in a different one of the notches in lever 24 it is possible to vary the rate at which the spring system applies load against the fluid pressure. Thus a position of spring 68 can be found which will change the rate of the system to accord with that necessary to actuate the various switches at the desired fluid pressures. The calibration of the instrument is thus simplified, and it is possible to provide an instrument having switch actuation at precise fluid pressure values without the time-consuming procedures previously necessary.

It will be noted that in the illustrated system springs 68 and 74 oppose one another; also, these springs are located at greater lever arm distances from shaft 28 than the lever arm distance from pin 22 to shaft 28. These factors enable the assembly to utilize fairly light springs to produce a relatively stiff character system. This feature is of advantage in that it permits more reliable sequencing operation without danger that resiliency factors will cause simultaneous actuation of two switches.

The drawings necessarily show a specific arrangement for accommodating a rate changing system wherein a plurality of anchoring points are provided on lever 24 and a single anchoring point is provided on the frame. It is contemplated however that within the broader aspects of the invention other rate changing arrangements could be employed. For example the system could employ a single anchor point on the lever and multiple anchor points on the frame. Additionally, it is not necessary that all of the force mechanism be connected directly with lever 24. For example, as shown in FIG. 4, the right end portion of lever 24 could be eliminated in favor of a second lever 25 fulcrummed on a shaft 27. This arrangement has the advantage that the heavy bending loads imposed by springs 68 and 74 are not applied to lever 24; as a result these bending loads are not effective to cause error in the switch actuation pressure values.

It will be understood that other modifications could be resorted to without departing from the spirit of the invention as set forth in the appended claims.

I claim:

1. In a spring system, a series of stationary electrical snap switches; fluid pressure-operated lever means connected with the switches for actuating said switches at preselected fluid pressures; first adjustable spring means operatively connected with and working on the actuating means to determine the fluid pressure at which one of the switches is operated; and second rate adjustment spring means continuously connected with and working on the actuating means, and adjustable to various positions in which the spring rate of the system is caused to be varied from one position to another, to thereby determine the differential between the actuation points for the switches.

2. The combination of claim 1 wherein the actuating means includes a single lever, the first spring means includes a first tension spring connected with one portion of the lever, and the second spring means includes a second tension spring connected with another portion of the lever.

3. In a spring system, two stationary electrical snap action switches, each having a movable operating plunger; swingable lever means having a first portion engaged with one of the switch plungers to move same and having a second portion engaged with a second switch plunger to move same; fulcrum means for swingably mounting the lever means; a fluid pressure-operated power member engaged with the lever means at one point to move same about the fulcrum means; a first adjustable spring means operatively engaged with the lever means and opposing the action of the fluid pressure to determine the actuation point for one of the switches; and a second rate adjustment spring means extending from a fixed anchorage to a selected one of a plurality of anchoring points on the lever means, said anchoring points being spaced slightly different distances from the fixed anchorage so that adjustment of the second spring means from one anchoring point to another is effective to vary the rate of the spring system without varying the effective force of the second spring means on the lever, whereby the second spring means is operable to determine the differential between the actuation points of the switches.

4. The combination of claim 3 wherein the lever means comprises two levers, and the fulcrum means comprises two pivot devices, one for each lever.

5. The combination of claim 4 wherein one of the levers operatively engages the switch plungers and the power member, and the other lever operatively engages both of the spring means so that any bending forces imposed by the spring means are applied only to the other lever without being transmitted to said one lever.

6. The combination of claim 3 wherein the lever means comprises two levers, one of said levers operatively engaging the switch plunger, and the other lever operatively engaging the two spring means.

7. The combination of claim 3 wherein the lever means comprises a single lever operatively engaging the power member, switch plungers, and two spring means.

8. In combination, lever means having a fulcrum means and at least three arm portions; a fluid pressure-operated power element engaging a first one of the lever arm portions at a point closely adjacent the fulcrum means; first spring means engaging a second one of the lever arm portions at a point remote from the fulcrum means; a plurality of snap action switches having switch-actuating plungers arranged in registry with the third arm portion of the lever means; and a second tension spring means extending from a fixed anchorage to a selected one of a plurality of anchoring points on the second arm portion of the lever means; said anchoring points being spaced different distances from the fixed anchorage point so that adjustment of the second spring means from one anchoring point to another is effective to vary the rate of the spring system defined by the snap action switches and pressure-operated power element.

9. In combination, two electrical snap action switches disposed in side by side relation and forming parts of a spring system; an operating plunger for each switch; lever means having a first portion engaged with one of the switch plungers to move same and having a second adjustable set screw portion engaged with a second switch plunger to move same; a fluid pressure-operated power member engaged with the lever means to move same in one direction; first aljustable spring means engaged with the lever means in tension and opposing the action of the fluid pressure thereon; and a second adjustable spring means engaging the lever means in tension in any one of a plurality of different locations; said locations being such that adjustment of the second spring means from one location to another is effective to vary the rate of the spring system without varying its initial effective load force on the lever means.

10. In combination, a series of electrical snap action switches, each having an operating plunger; lever means having a first portion engaged with one of the switch plungers and having a second portion engaged with a second switch plunger; fulcrum means for the lever means; a fluid pressure-operated power member engaged with the lever means to move same in one direction; first adjustable spring means engaged with the lever means opposing the action of the fluid pressure to determine the pressure at which one of the switches is actuated; a series of spring anchoring points located on the lever means at progressively increasing distances from the fulcrum means; a single fixed anchorage point; and a tension spring trained between the fixed anchorage point and a selected one of the lever means anchoring points so that adjustment of the tension spring from one anchoring point to another is effective to vary the rate of the spring system.

References Cited by the Examiner
UNITED STATES PATENTS

| | | | |
|---|---|---|---|
| 1,623,842 | 4/27 | King | 200—83 |
| 1,723,635 | 8/29 | Tannehill | 200—83 |
| 2,255,666 | 9/41 | Judson | 200—81.5 |
| 2,355,872 | 8/44 | Kronmiller | 200—83 |
| 2,489,422 | 11/49 | Kuhn | 200—83 |

BERNARD A. GILHEANEY, *Primary Examiner.*

WALTER STOLEWIN, *Examiner.*